United States Patent
Okamura

(10) Patent No.: US 7,609,320 B2
(45) Date of Patent: Oct. 27, 2009

(54) IMAGING DEVICE, IMAGING DEVICE IMAGE OUTPUT METHOD, AND COMPUTER FOR ASSIGNING A DYNAMIC RANGE

(75) Inventor: Keisuke Okamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 679 days.

(21) Appl. No.: 10/528,968

(22) PCT Filed: Sep. 18, 2003

(86) PCT No.: PCT/JP03/11923

§ 371 (c)(1),
(2), (4) Date: Mar. 23, 2005

(87) PCT Pub. No.: WO2004/030348

PCT Pub. Date: Apr. 8, 2004

(65) Prior Publication Data

US 2006/0033823 A1   Feb. 16, 2006

(30) Foreign Application Priority Data

Sep. 25, 2002   (JP)   ............................. 2002-279256

(51) Int. Cl.
*G03B 7/00* (2006.01)
*H04N 5/235* (2006.01)
(52) U.S. Cl. ...................... 348/362; 348/221.1; 348/241
(58) Field of Classification Search ............... 348/222.1, 348/223.1, 362, 382, 361, 367, 689, 257, 348/241–251, 389, 221.1
See application file for complete search history.

(56) References Cited

U.S. PATENT DOCUMENTS 5,589,880 A * 12/1996 Tsukui ...................... 348/229.1
7,092,019 B1   8/2006 Ogata et al.
7,466,358 B1 * 12/2008 Kusaka et al. ............... 348/362

FOREIGN PATENT DOCUMENTS

| EP | 0 866 608 | 9/1998 |
|---|---|---|
| JP | 5-130499 | 5/1993 |
| JP | 2000 341582 | 12/2000 |
| JP | 2002-84449 | 3/2002 |

OTHER PUBLICATIONS

Machine English Translation of JP 2002-084449 A (JP document published on Mar. 22, 2002).*

* cited by examiner

*Primary Examiner*—Lin Ye
*Assistant Examiner*—Nelson D. Hernández Hernández
(74) *Attorney, Agent, or Firm*—Frommer Lawrence & Haug LLP; William S. Frommer; Thomas F. Presson

(57) ABSTRACT

An image pickup apparatus for performing dynamic assignment of an output image in a dynamic range according to a subject. An image pickup device picks up an image of a subject, a signal processing section generates a composite image having a relatively wider dynamic range than at least either of the dynamic ranges of a long-time exposure image picked up with a relatively long exposure time by the image pickup device and a short-time exposure image picked up with a relatively short exposure time by the image pickup device, by synthesizing the long-time exposure image and the short-time exposure image A, control section compresses the composite image and dynamically varies the assignment proportion of a high luminance dynamic range to a low-middle luminance dynamic range in a dynamic range of an output image to be outputted as a video signal.

37 Claims, 10 Drawing Sheets

IMAGING DEVICE, IMAGING DEVICE IMAGE OUTPUT METHOD, AND COMPUTER FOR ASSIGNING A DYNAMIC RANGE

TECHNICAL FIELD

The present invention relates to an image pickup apparatus and, more particularly, to an image pickup apparatus having an expandable dynamic range.

BACKGROUND ART

Image pickup apparatuses such as video cameras, digital video cameras or still video cameras having image pickup devices such as CCDs (Charge Couple Devices) are widely and generally used.

Image pickup devices such as CCDs are narrow in dynamic range compared to silver halide cameras. For this reason, when an image is taken against backlight with such an image pickup device, lost highlight detail which causes a bright section to lose grayscale or lost shadow detail which causes a dark section to lose grayscale occur in a reproduced image.

In a conventional type of image pickup apparatus, the amount of exposure is adjusted to become correct for a subject, by an automatic exposure function, but there still remain many cases where although a main section of a subject has correct exposure, lost highlight detail and the like occurs in a background and the like.

In addition, in the conventional type of image pickup apparatus, back compensation has been performed in such a manner that the reproducibility of an image at a low luminance signal level/a middle luminance signal level (a low-middle luminance signal level) is weighted while the detail of a high luminance section is lost. However, there are also cases where lost highlight details in a background desire to be made visible.

For this reason, in order to cope with an image of wide dynamic range containing a bright section and a dark section as mentioned above, there has been provided an image pickup apparatus (wide dynamic range camera) capable of taking an image of wide dynamic range by synthesizing an image whose main subject is a comparatively bright section captured by a high speed shutter or the like and an image whose main subject is a comparatively dark section captured by a low speed shutter or the like.

However, in the above-mentioned image pickup apparatus capable of taking an image of wide dynamic range, such as a wide dynamic range camera, the proportion in which the dynamic range of an output image reproducible as a video signal is assigned to a high luminance section in which the luminance signal levels correspond to high luminance and to a low-middle luminance section in which the luminance signal levels correspond to low luminance/middle luminance is constantly fixed irrespective of the kind of subject.

Accordingly, for example, if an image signal of the high luminance section is absent in the output image, an image signal assigned to the high luminance section in the dynamic range of the output image is absent, while the remaining low-middle luminance section only is assigned to the dynamic range. This hinders effective use of the dynamic range and provides a generally dark image.

The present invention has been conceived in view of the above-mentioned problems, and an object of the present invention is to provide a novel and improved image pickup apparatus capable of performing dynamic assignment in the dynamic range of an output image according to the kind of subject.

DISCLOSURE OF THE INVENTION

To solve the above-mentioned problems, according to a first aspect of the present invention, an image pickup apparatus may include an image pickup device for picking up an image of a subject, a signal processing section for generating a composite image having a relatively wider dynamic range than at least either of the dynamic ranges of a long-time exposure image picked up with a relatively long exposure time by the image pickup device and a short-time exposure image picked up with a relatively short exposure time by the image pickup device, by synthesizing the long-time exposure image and the short-time exposure image, and a control section for compressing the composite image and dynamically varies the proportion of a high luminance dynamic range to a low-middle luminance dynamic range in a dynamic range of an output image to be outputted as a video signal.

According to the present invention, a long-time exposure image and a short-time exposure image are synthesized on the basis of an image signal picked up by the image pickup device, whereby a composite image of expanded dynamic range is generated. Furthermore, the proportion in which the dynamic range of the composite image is assigned to either the high luminance dynamic range or the low-middle luminance dynamic range of an output image is dynamically varied to compress and assign the high luminance dynamic range and the low-middle luminance dynamic range of the composite image. In this construction, for example, even if a picked-up image is a dark image in which a signal amount occupying its high luminance region is small as a whole, the proportion is dynamically varied to an appropriate assignment proportion, whereby clear images may be constantly outputted with correct grayscale. The assignment proportion means the proportion in which the dynamic range is assigned to either the high luminance dynamic range or the low-middle luminance dynamic range.

The control section dynamically varies the assignment proportion of the high luminance dynamic range to the low-middle luminance dynamic range according to at least a luminance region which occupies the composite image. In this construction, the assignment proportion may be varied according to a variation in the degree of brightness which occupies the composite image. Accordingly, for example, even if a high luminance region in the luminance region decreases and a dark image occurs, correct grayscale may be obtained by increasing the proportion of assignment to the low-middle luminance dynamic range with respect to the proportion of assignment to the high luminance dynamic range.

The control section corrects the assignment proportion of the high luminance dynamic range to the low-middle luminance dynamic range each time the composite image is generated. In this construction, each time the composite image is generated, it is determined whether the assignment proportion of the dynamic ranges is appropriate, and if inappropriate, the assignment proportion is corrected. Accordingly, it is possible to constantly output an image reproduced with appropriate grayscale.

The luminance region is at least either a high luminance region or a low-middle luminance region. In this construction, it is possible to realize assignment of the dynamic ranges by taking note of the high luminance region, the low-middle luminance region or the high luminance region the low-middle luminance region. In addition, the luminance region is not limited to the above-mentioned one, and may also be made of, for example, a high luminance region, a middle luminance region and a low luminance region.

The control section dynamically varies the assignment proportion of the high luminance dynamic range to the low-middle luminance dynamic range according to at least an average luminance signal level of the high luminance region which occupies the composite image. In this construction, the assignment proportion is dynamically varied according to variations in a bright section (the high luminance region) of the composite image. Accordingly, it is possible to weight the low-middle luminance region which is contained in many subjects, and increase the low-middle luminance dynamic range.

The control section may be adapted to dynamically vary the assignment proportion of the high luminance dynamic range to the low-middle luminance dynamic range according to at least an average luminance signal level of the low-middle luminance region which occupies the composite image.

The control section dynamically varies the assignment proportion of the high luminance dynamic range to the low-middle luminance dynamic range according to at least the high luminance region which occupies the composite image. In this construction, the assignment proportion is dynamically varied according to variations in a bright section (the high luminance region) of the composite image. For example, if a bright section decreases, the grayscale of a dark section is increased so that the reproducibility thereof may be improved.

The control section may be adapted to dynamically vary the assignment proportion of the high luminance dynamic range to the low-middle luminance dynamic range according to at least the low-middle luminance region which occupies the composite image.

The control section at least monotonically varies the assignment proportion of the high luminance dynamic range to the low-middle luminance dynamic range. This construction makes it possible to gradually vary the assignment proportion. Accordingly, since a sharp variation does not occur, the variation of the assignment proportion may be applied in many kinds of locations. The present invention is not limited to the above-mentioned example, and may also be carried out in the case where the assignment proportion is varied like a quadratic curve.

The luminance region may be configured to be at either a high luminance region or a low-middle luminance region.

Among pixels constructed in the composite image, pixels corresponding to at least a higher luminance signal level than a switch luminance signal level may be acquired from the short-time exposure image, while pixels corresponding to a lower luminance signal level than the switch luminance signal level may be acquired from the long-time exposure image.

Among pixels constructed in the composite image, pixels corresponding to at least a higher luminance signal level than a switch luminance signal level may be acquired from the long-time exposure image, while pixels corresponding to a lower luminance signal level than the switch luminance signal level may be acquired from the short-time exposure image.

The dynamic range is at least either a high luminance dynamic range or a low-middle luminance dynamic range.

The present invention is characterized in that a compression gain for compressing a luminance signal level of the composite image is determined on the basis of at least the assignment proportion of a high luminance dynamic range of an output image to a low-middle luminance dynamic range thereof.

The present invention may be constructed to determine a high luminance compression gain for compressing a luminance signal level of the high luminance region in the composite image and a low-middle luminance compression gain for compressing a luminance signal level of the low-middle luminance region in the composite image.

The present invention may be constructed to determine for each luminance signal level of the composite image at least either a final high luminance compression gain or a final low-middle luminance compression gain which is to be used for compression, on the basis of at least either the high luminance compression gain or the low-middle luminance compression gain.

The present invention may be constructed to dynamically vary the assignment proportion of the high luminance dynamic range to the low-middle luminance dynamic range of the output image according to at least the high luminance region which occupies the composite image.

BEST MODES FOR CARRYING OUT THE INVENTION

Figure 1:
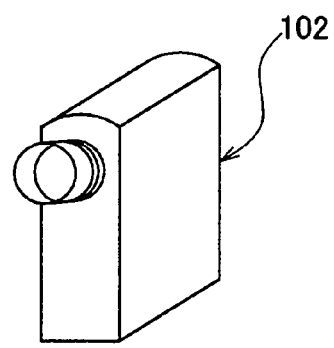
FIG. 1 is a perspective view showing a schematic construction of a wide dynamic range camera according to the present embodiment.

A preferred embodiment of the present invention will be described below in detail with reference to the accompanying drawings. In the following description and accompanying drawings, constituent elements having approximately identical functions are denoted by identical reference numerals, and repetition of the same description is omitted herein.

(1. Wide Dynamic Range Camera)

Figure 2:
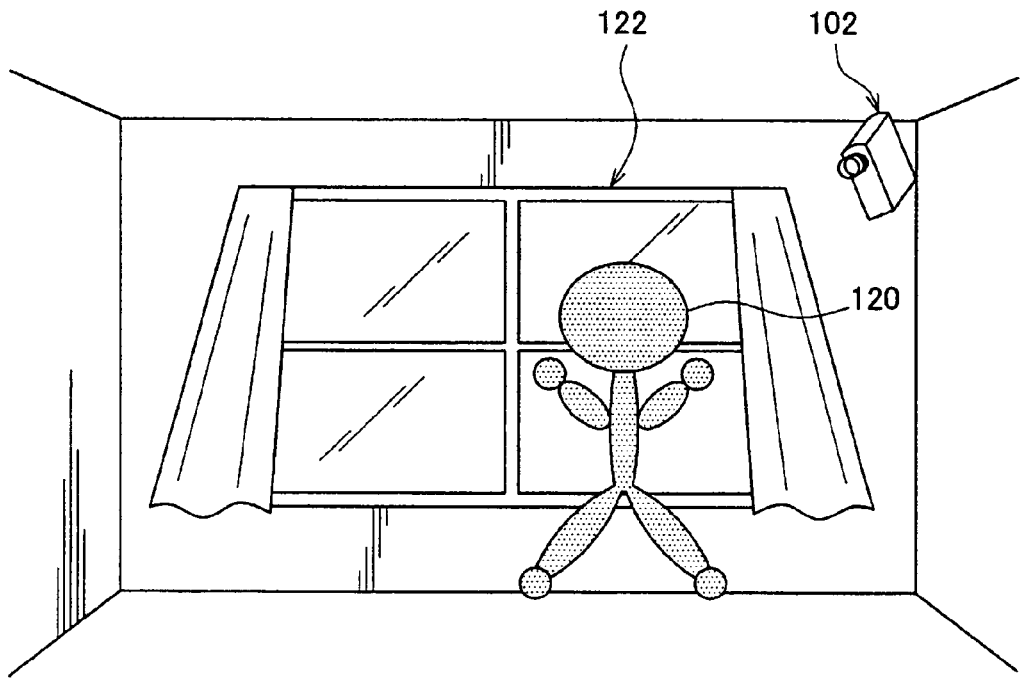
FIG. 2 is an explanatory view showing a schematic subject in a case in which the interior a house having a window according to the present embodiment.

First, a wide dynamic range camera (wide D camera) according to the present embodiment will be described with reference to FIGS. 1 and 2. FIG. 1 is a perspective view showing a schematic construction of the wide dynamic range camera according to the present embodiment. FIG. 2 is an explanatory view showing a schematic subject in a house which has a window and whose indoor state is being captured according to the present embodiment. An image pickup apparatus 102 according to the present embodiment is capable of picking up a still image and/or a moving image.

As shown in FIG. 2, when the image pickup apparatus which is generally used as a digital video camera, a still video camera and the like is to pick up an indoor image of a house having a window 122 in, for example, a daytime period in fine weather, if the image pickup apparatus sets an exposure reference for a subject to the person 120 who is present indoors, the window 122 which is brighter than the person 120 loses grayscales and suffers loss of highlight detail.

This is because the image pickup apparatus may not handle a dynamic range which extends over a wide range from the luminance of the person 120 which is relatively smaller than that of the window 122 to the luminance of the window 122 which is relatively brighter than that of the person 120.

To solve the above problem, there is an image pickup apparatus called a wide dynamic range camera (wide D camera). The image pickup apparatus has, for example, the function of performing processing such as varying the shutter speed of an electronic shutter and synthesizing a plurality of images each having a different exposure time, so that even if an exposure reference for a subject is set to the person 120 as shown in FIG. 2, the window 122 may be prevented from suffering loss of highlight detail and reproduced as a good grayscale image.

As techniques for picking up an image of a subject having a wide dynamic range to be reproduced as an output image containing various sections from a bright section to a dark section, there are, in addition to the above-mentioned method of synthesizing a bright image and a dark image each having a different exposure time, a method of changing the sensitivity of an image pickup device in units of pixels, extracting only signals having the same exposure condition from the image pickup device, reproducing images, and synthesizing one or not less than two images each having a different exposure condition, and a method of dividing incident light by means of a prism and synthesizing a signal outputted from an image pickup device and a signal outputted from an image pickup device to which is stuck a device having a light reduction function like an ND filter (Neutral Density Filter; a light amount adjustment filter) which reduces transmitted light overall wavelengths, i.e., equally reduces the amount of incident light.

The wide D camera 102 shown in FIG. 1 has a dynamic range far wider than those of generally used video cameras, and is capable of picking up an image of a subject having a wide dynamic range to be reproduced as an output image containing various sections from a bright section to a dark section. Accordingly, the wide D camera 102 is suitable for picking up an image at an indoor location which is shone with strong external light, a location exposed to greatly different light intensities, and the like.

For example, the wide D camera 102 is particularly used as a surveillance camera or the like which often picks up images in the case where the dynamic range greatly varies between time periods when image pickup is to be performed, such as the daytime and the nighttime. In addition, the wide D camera 102 used in the present embodiment is not limited to the surveillance camera.

(2. Construction of Each Component of Wide Dynamic Range Camera)

Figure 3:
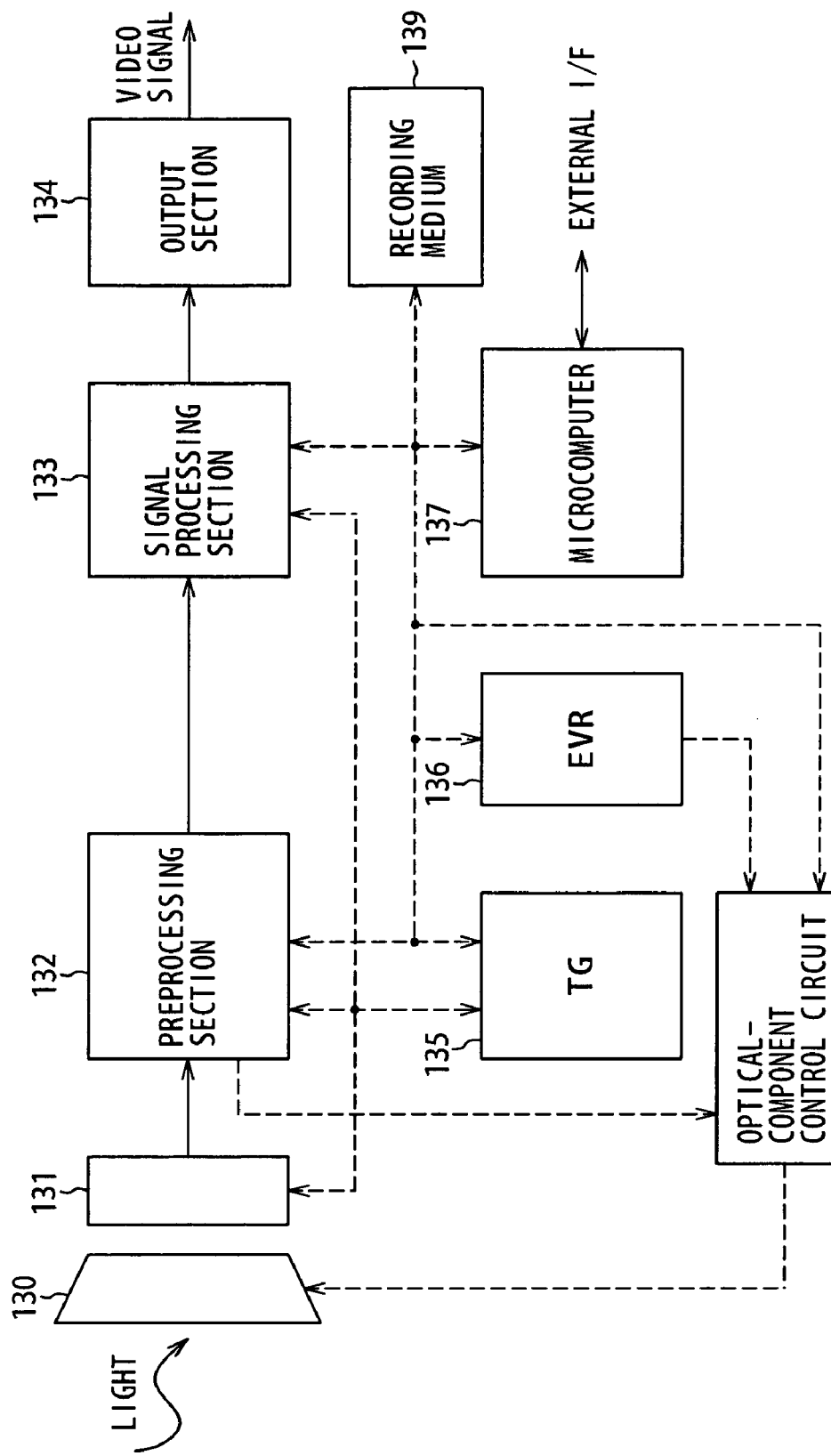
FIG. 3 is a block diagram showing a schematic construction of the wide dynamic range camera according to the present embodiment.

The construction of each component of the wide D camera 102 according to the present embodiment will be described below with reference to FIG. 3. FIG. 3 is a block diagram showing a schematic construction of the wide dynamic range camera according to the present embodiment. In FIG. 3, for example, a microcomputer 137 corresponds to a control section of the present invention, but is not limited to this example.

As shown in FIG. 3, the wide D camera 102 according to the present embodiment may include an optical component 130, an image pickup device 131, a preprocessing section 132, a signal processing section 133, an output section 134, a TG 135, an EVR 136, the microcomputer 137 (hereinafter referred to as the microcomputer 137), an optical-component control circuit 138, and a recording medium 139.

The optical component 130 is an optical filter which reduces unnecessary wavelengths, such as an ND filter. Light incident from a subject onto the optical component 130 and transmitted therethrough is picked up by the image pickup device 131, and is converted into an electrical signal. In addition, the optical component 130 has, for example, a lens iris and the like to be controlled by the microcomputer 137 via the optical-component control circuit 138. The microcomputer 137 will be described later in detail.

The image pickup device (image pickup device) 131 is capable of photoelectrically converting an optical image received from the subject and outputting an electrical image signal, by means of a plurality of pixels respectively made of photoelectric conversion devices disposed two-dimensionally on a light receiving surface. For example, the image pickup device 131 is a solid-state image pickup device such as a CCD made of a multiplicity of kinds.

The preprocessing section 132, if the image pickup device 131 is a CCD, receives the above-mentioned image signal outputted from the image pickup device 131, and then takes out a video signal while reducing noise (noise) by the processing of CDS (a correlated double sampling circuit; correlated double sampling).

Furthermore, the preprocessing section 132 gives a gain to the video signal to amplify the video signal to a suitable signal level as occasion demands, and transmits the video signal to the signal processing section 133.

The main noise of the CCD which constitutes the image pickup device 131 may include, for example, transfer noise, noise of an output amplifier, reset noise, noise caused by dark current, and light shot noise.

Among the above-mentioned kinds of noise, the transfer noise is noise produced when charges are being transferred, but rarely becomes a problem since buried channel CCDs are generally used. The noise of the output amplifier is noise of a source follower, and if this noise is reduced, the noise of the CCD is ameliorated.

The reset noise is noise produced when the FD (floating diffusion) of the CCD is reset, and CDS makes it possible to reduce this reset noise.

The signal processing section 133 is made of two major blocks. One is a signal preprocessing block 140 which performs extraction of an inputted long-time exposure image and an inputted short-time exposure image each having a different exposure time, correction of the color balance between the long-time exposure image and the short-time exposure image, and synthesis and compression of the long-time exposure image and the short-time exposure image. The exposure times of the long-time exposure image and the short-time exposure image may be individually set according to subjects whose images are to be picked up. The signal preprocessing block 140 will be described later in detail.

The other block following the signal preprocessing block is a signal post procesing block (not shown) which performs color processing such as aperture (aperture) processing for performing γ(gamma) correction and contour correction, and white balance for adjusting color temperature on the basis of "white" contained in the subject.

Furthermore, the signal processing section 133 has at least a detection section 143 and is capable of detecting level information such as a luminance signal level, color information or the like of an image signal inputted at the present point in time. The signal processing section 133 is capable of calculating gains such as compression gains and adjusting white balance on the basis of the detected information. The detection section 143 will be described later in detail.

The output section 134 receives the video signal from the signal processing section 133 after the processing of the signal processing section 133, and outputs a video image to a monitor such as a display device through a driver of the output section 134 in order to reproduce the video image.

The TG (timing generator) 135 generates pulses necessary for the image pickup device 131 made of a CCD or the like. For example, pulses such as 4-phase pulses for vertical transfer, field shift pulses, and 2-phase pulses for horizontal transfer are generated. The image pickup device 131 may be driven (electronic shutter function) by the TG 135.

By adjusting the driving of the image pickup device 131, it is possible to pick up a long-time exposure image having a relatively long exposure time and a short-time exposure image having a relatively short exposure time. In the image pickup apparatus 102 which is the wide dynamic range camera according to the present embodiment, image pickup processing is performed by the above-mentioned processing, but image pickup processing according to the present embodiment is not limited to this example.

The EVR (electronic volume) 136 is a variable resistor whose resistance value may be adjusted by digital signals or the like, and controls the optical-component control circuit 138 and the like by varying the resistance value. Accordingly, iris adjustment of a lens which constitutes the optical component 130 may be performed by the EVR 136 and the like. In addition, the EVR 136 has storage means such as a memory, and may hold a varied resistance value when a power source is turned off.

The optical-component control circuit 138 has control means (not shown) for performing control such as iris adjustment of the optical component 130 or switching from one optical filter to another such as an ND filter among a plurality of optical components 130.

The microcomputer 137 controls the processing of each of the preprocessing section 132, the signal processing section 133, the TG 135, the EVR 136 and the optical-component control circuit 138 on the basis of, for example, a detection result from the above-mentioned detection section 143. In addition, the microcomputer 137 determines compression gains (compression gains) and the like for synthesizing and compressing a long-time exposure image (long) and a short-time exposure image (short) of the image pickup apparatus 102 which is the wide dynamic range camera. The microcomputer 137 will be described later in detail.

Furthermore, the microcomputer 137 may control the image pickup apparatus 102 by mutually communicating, for example, control data for controlling the apparatus with an apparatus outside of the image pickup apparatus 102 via an "external I/F (external interface)". The "external I/F" is, for example, Ethernet (registered trademark) such as 10Base-T or 10Base-2, EIA-232, EIA-485 or the like.

The storage medium 139 is capable of storing, for example, control data necessary for control of individual sections provided in the image pickup apparatus 102, adjustment data for adjustment of exposure of subjects, user setting data such as color correction and AE which may be various set by individual users who use the image pickup apparatus 102.

The storage medium 139 may use, for example, a ROM which may store data written thereto, and an EEPROM (Electrically Erasble and Programmable ROM) which may store or erase data by electrical erasure.

(2.1 Signal Preprocessing Block 140)

Figure 4:
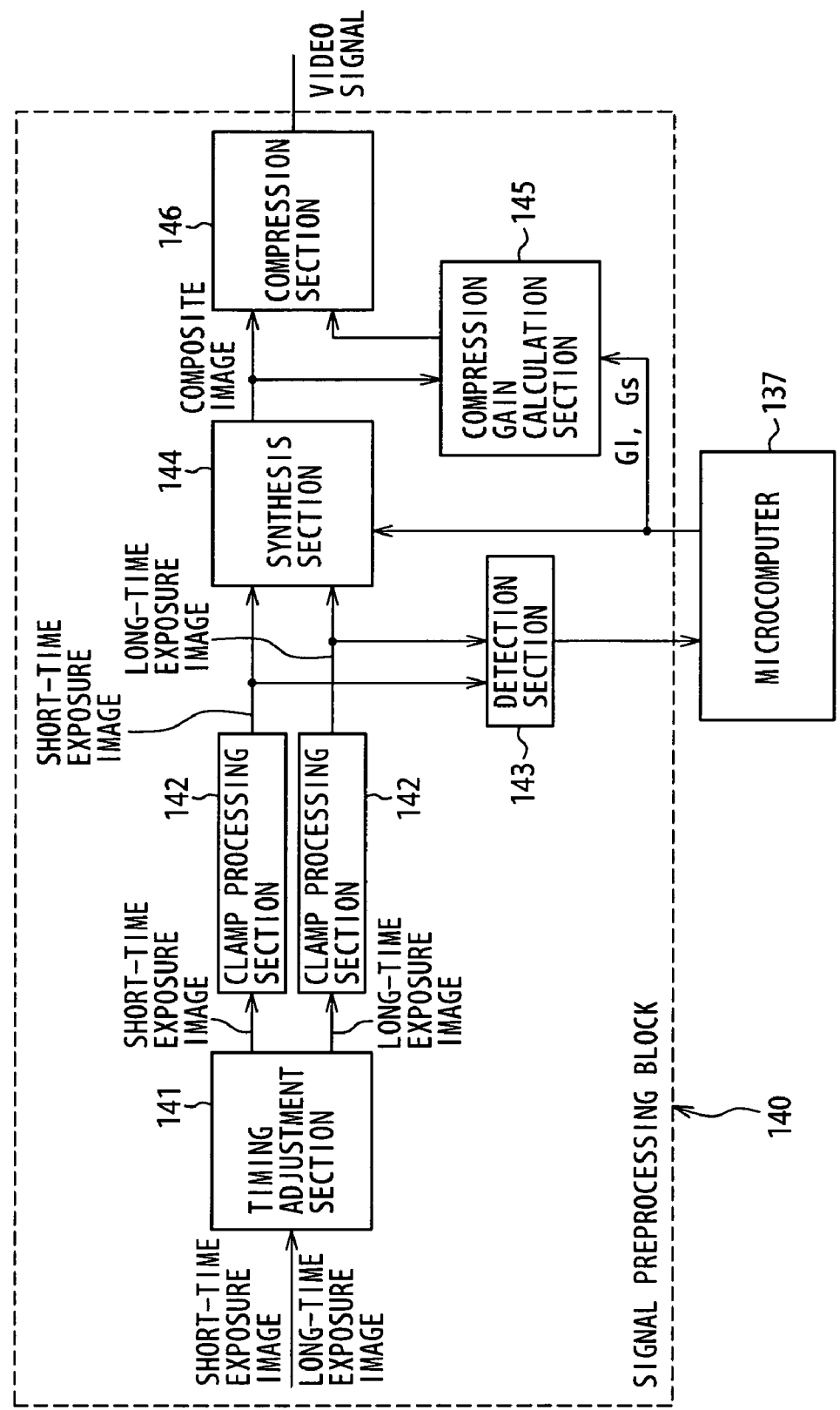
FIG. 4 is a block diagram showing a schematic construction of a signal preprocessing block according to the present embodiment.

The signal preprocessing block included in the signal processing section 133 according to the present embodiment will be described below with reference to FIG. 4. FIG. 4 is a block diagram showing a schematic construction of the signal preprocessing block according to the present embodiment.

In FIG. 4, for example, the microcomputer 137 corresponds to the control section of the present invention, while a compression gain calculation section 145 corresponds to a compression gain calculation section of the present invention, but this example is not restrictive. Furthermore, although the compression gain calculation section 145 is provided in the signal preprocessing block 140, the present invention is not limited to this example, and may also be carried out even in various other cases such as the case where the compression gain calculation section 145 is provided in the microcomputer 137 as the control section, and the case where the compression gain calculation section 145 is provided in a section other than the signal preprocessing block 140.

As shown in FIG. 4, the signal preprocessing block 140 may include a timing adjustment section 141, clamp processings 142, a detection section 143, a synthesis section 144, the compression gain calculation section 145, and a compression section 146.

The timing adjustment section 141 adjusts (synchronizes) the timings of image signals having different exposure times, which are respectively outputted from the preprocessing section 132 at different timings, to a synchronized timing. Synchronization processing in the timing adjustment section 141 will be described below.

Figure 5:
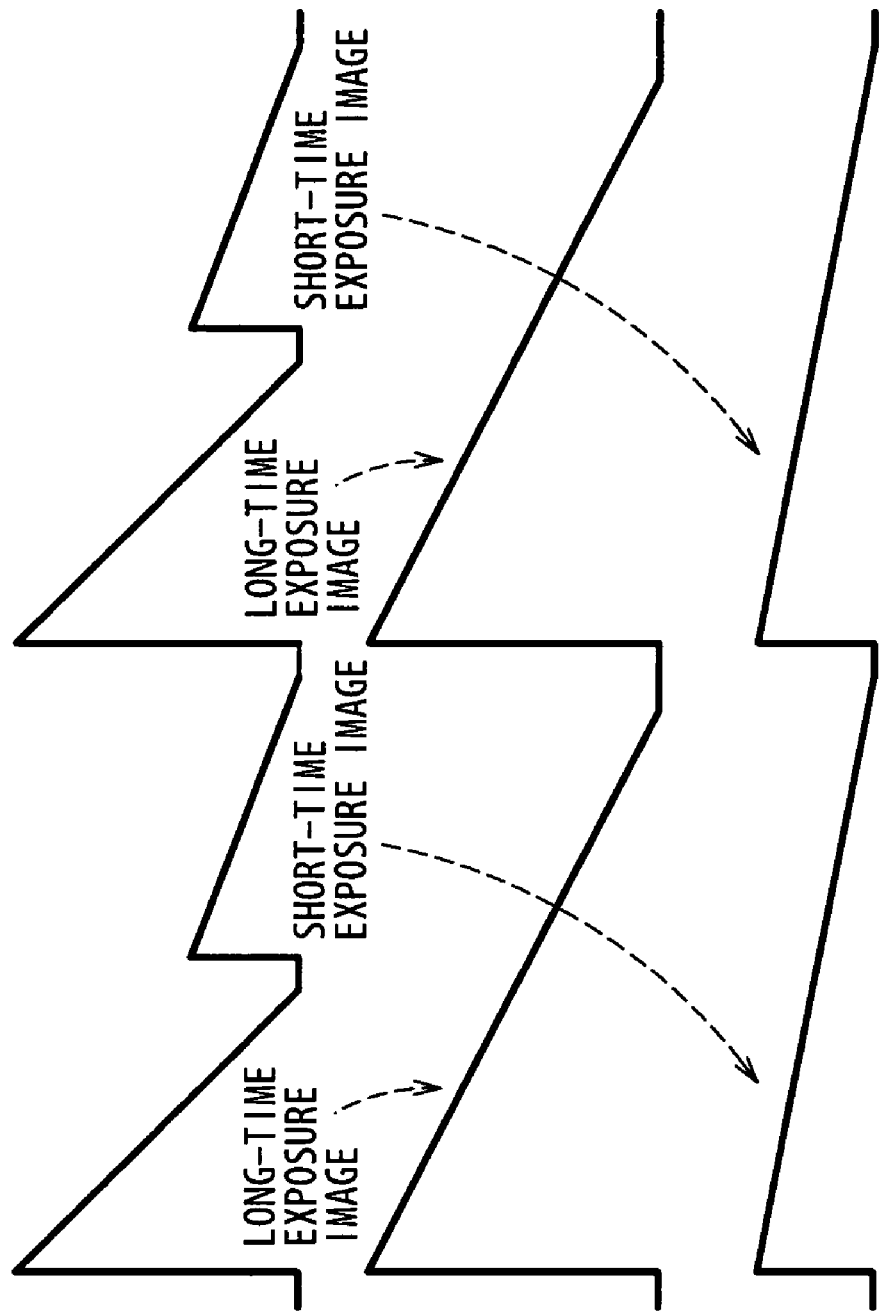
FIGS. 5A to 5C are explanatory views schematically showing the synchronization processing of a timing adjustment section according to the present embodiment.

First, as shown in FIG. 5A, a long-time exposure image signal (long signal) containing a long-time exposure image (long) picked up by the image pickup device 131, and a short-time exposure image signal (short signal) containing a short-time exposure image (short) picked up by the same are transmitted from the preprocessing section 132 to the timing adjustment section 141 via one bus (path) shown in FIG. 4 in such a manner that the long signal and the short signal are alternately arranged by time sharing. FIGS. 5A to 5C are explanatory views schematically showing the synchronization processing of the timing adjustment section 141 according to the present embodiment.

When the long-time exposure image signal and the short-time exposure image signal are alternately inputted to the timing adjustment section 141 in a time-shared manner, the timing adjustment section 141 performs synchronization on the long-time exposure image and the signal short-time exposure image signal.

The above-mentioned synchronization extracts the long-time exposure image and the signal short-time exposure image signal contained in one signal, as shown in FIG. 5A, and adjusts (performs synchronization on) the temporal timing of the long-time exposure image contained in the long-time exposure image signal and the temporal timing of the short-time exposure image contained in the short-time exposure image signal, as shown in FIGS. 5B (long-time exposure image signal) and 5C (short-time exposure image signal). As shown in FIG. 4, the timing adjustment section 141 separately outputs the short-time exposure image and the long-time exposure image to the respective clamp processing sections 142.

Since the synchronization is performed in the timing adjustment section 141, switching of pixels may be smoothly performed when the long-time exposure image and the short-time exposure image are to be synthesized in the synthesis section 144, whereby the synthesis section 144 may efficiently carry out synthesis processing.

Then, the clamp processing sections 142 determine a "0 level (black level)" reference from the luminance signal levels of the long-time exposure image and the short-time exposure image (clamp processing). After the determination of the 0 level, each of the clamp processing sections 142 outputs the corresponding one of the long-time exposure image and the short-time exposure image to both the synthesis section 144 and the detection section 143.

The respective clamp processing sections 142 perform reproduction of direct current components, reduce low frequency noises, and determine where the 0 level is, by making use of the fact that the long-time exposure image signal and the short-time exposure image signal have periodicity. In composite video signals and luminance signals, black levels are used as references, and direct current values represent information. Accordingly, in signal processing, the black levels are fixed, and the processing is performed on the basis of these levels.

The detection section 143 detects what signal amount is inputted and what the luminance signal level is, as to each of the long-time exposure image signal and the short-time exposure image signal outputted from the clamp processing sections 142. The luminance signal level (luminance level) indicates the degree of brightness.

Namely, when a detection result of the detection section 143 is outputted to individual sections such as the microcomputer 137, the individual sections become able to execute processing. The detection section 143 detects the signal amount or the distribution of the luminance signal level (a histogram of the luminance signal level) of each of the inputted long-time and short-time exposure images so that the microcomputer 137 in particular may determine a switch point for synthesis of the long-time exposure image and the short-time exposure image.

The synthesis section 144 performs level adjustment on the exposure levels of the inputted long-time exposure image and short-time exposure image, and synthesizes both exposure images into one image by performing switch processing in units of pixels. The generated composite image is outputted to the compression section 146 and the compression gain calculation section 145 as a composite image signal. The synthesis processing of the synthesis section 144 to synthesize the long-time exposure image and the short-time exposure image will be described later in detail.

The microcomputer 137 may receive the signal amounts or the histograms of the luminance signal levels detected from the respective long-time and short-time exposure image signals. In addition, an average luminance signal level and the like of a high luminance region or a low-middle luminance region may be found from the signal amount of each of the luminance signal levels.

The microcomputer 137, on the basis of information such as the detection result acquired from the detection section 143, performs processing such as adjustment of the exposures of the short-time exposure image and the long-time exposure image, correction of the proportion of a high luminance dynamic range and a low-middle luminance dynamic range in the dynamic range of an output image to be outputted as a video signal, determination of the switch point for synthesis of the short-time exposure image and the short-time exposure image, or determination of the compression gains (compression gains) of the generated composite image. The above-mentioned switch point or compression gains and the like are transmitted to each of the processing sections of the signal preprocessing block 140 by the microcomputer 137. In addition, the respective compression gains are constructed for different luminance regions. The compression gains in the present embodiment include a high luminance compression gain (Gs) and a low-middle luminance compression gain (Gl), but this example is not restrictive. For example, the compression gains may be made of a high luminance compression gain, a low-middle luminance compression gain and a low luminance compression gain. The operation processing of the microcomputer 137, such as determination of the switch point, correction of the proportion of the dynamic ranges and determination of the compression gains will be described later in detail.

During compression of the generated composite image, the compression gain calculation section (Compression Gain Calculator) 145 calculates final compression gains for the respective luminance signal levels to be compressed, on the basis of the above-mentioned compression gains (the high luminance compression gain (Gs) and the low-middle luminance compression gain (Gl)) transmitted from the microcomputer 137, and transmits the final compression gains to the compression section 146. The final compression gains in the present embodiment include a final high luminance compression gain and a final low-middle luminance compression gain, but this example is not restrictive.

The compression section 146 compresses the dynamic range of the composite image synthesized by the synthesis section 144 to the dynamic range of an output image to be outputted as a video signal, on the basis of the inputted final compression gains. The compressed output image is transmitted to the next signal postprocessing block (not shown).

The output image outputted from the compression section 146 is inputted to the signal postprocessing block, in which color processing such as gamma correction, aperture or white balance is executed.

In the color processing, since the gamma characteristic of, for example, a CRT (Cathode Ray Tube, a picture tube) is determined, the image pickup apparatus 102 must perform correction in advance so that a reproduced picture may obtain correct grayscale characteristics. Accordingly, the correction needs to be performed by gamma correction. In general, diode characteristics are used.

(3. Image Output Operation of Image Pickup Apparatus 102)

An embodiment of the image output operation of the image pickup apparatus 102 constructed in the above-mentioned manner will be described below.

(3.1 Image Processing (S160) of Image Pickup Apparatus)

Figure 6:
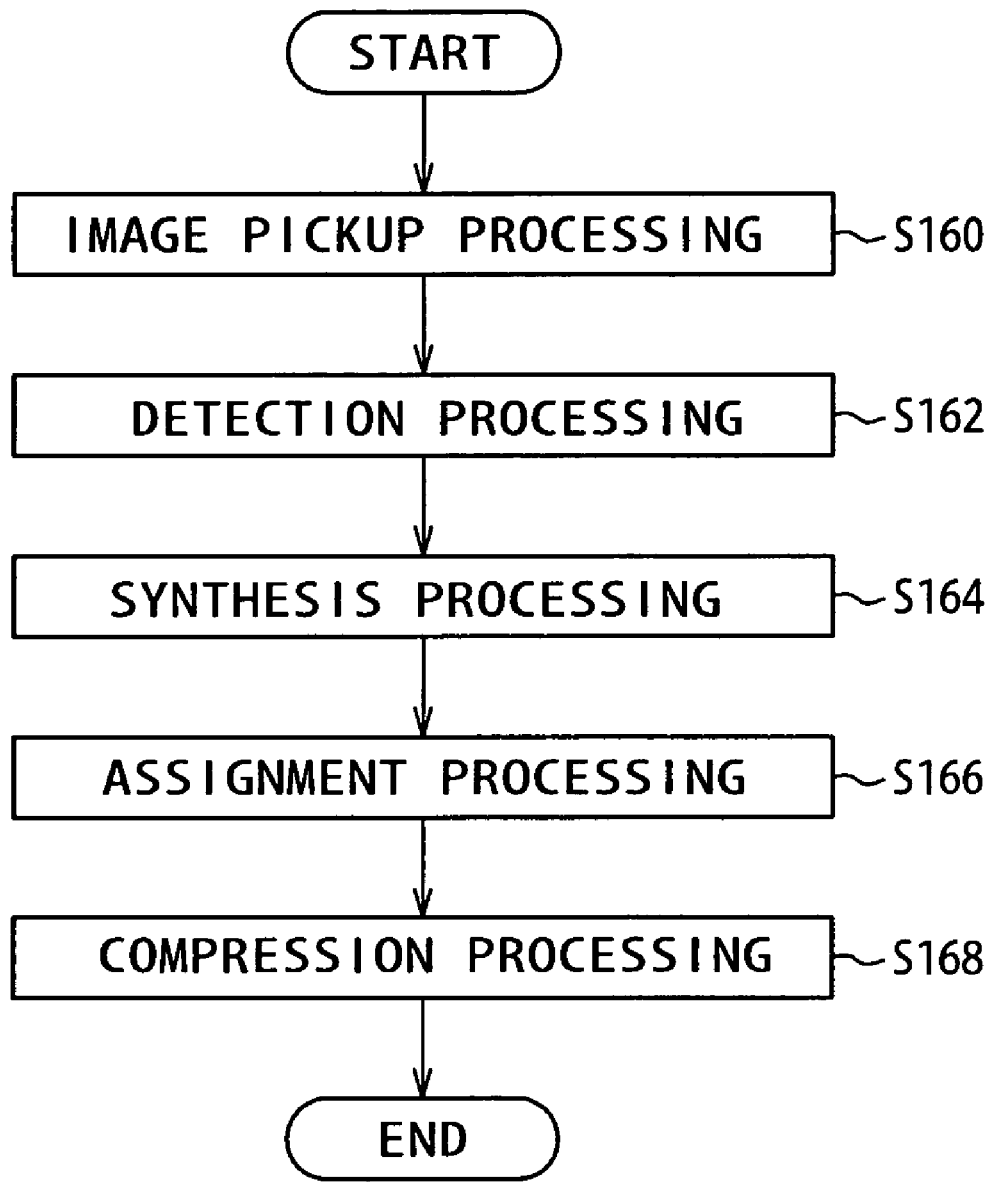
FIG. 6 is a flowchart schematically showing the image output processing of an image pickup apparatus according to the present embodiment.

First, the image pickup processing of the image pickup apparatus 102 will be described below with reference to FIGS. 3, 4 and 6. FIG. 6 is a flowchart schematically showing the image output processing of the image pickup apparatus according to the present embodiment.

First, as shown in FIG. 6, the image pickup apparatus 102 which is a wide dynamic camera performs image pickup processing (S160) of a subject by means of the image pickup device 131. Although the image pickup processing according to the present embodiment is image pickup processing based on a double exposure method, the present invention is not limited to this example, and may also be carried out in the case of, for example, a 2-CCD type which uses two image pickup devices 131 such as CCDs and has a standard-speed shutter and a high-speed shutter.

The double exposure method is a method of picking up a long-time exposure image of a subject which needs a relatively long exposure time and whose correct exposure is in a low-middle luminance region and a short-time exposure image of a subject whose correct exposure is in a high luminance region, and synthesizing both images to expand an apparent dynamic range. The term "luminance region" means a region formed by an aggregation of pixels or signals constructed in an image having approximately the same luminance level. For example, a high luminance region denotes a region formed by pixels or signals of high luminance levels, among pixels or signals constructed in an image.

After the above-mentioned image pickup processing (S160), the long-time exposure image (long) and the short-time exposure image (short) which have been outputted from the image pickup device 131 and subjected to, for example, CDS processing by the preprocessing section 132 are transmitted to the timing adjustment section 141 of the signal preprocessing block 140 of the signal processing section 133 shown in FIG. 4.

The above-mentioned both image signals are alternately inputted to the timing adjustment section 141 via one bus at different timings in such a manner that the long-time exposure image (long) and the short-time exposure image (short) are time-shared, so that both image signals need to be synchronized as described above.

(3.2. Detection Processing (S162) of Image Pickup Apparatus 102)

After the long-time exposure image and the short-time exposure image have been synchronized in the timing adjustment section 141, both exposure images are separately outputted from the timing adjustment section 141 and inputted to the clamp processing sections 142. After having been subjected to clamp-processing in the clamp processing sections 142, the long-time exposure image and the short-time exposure image are transmitted to each of the detection section 143 and the synthesis section 144.

When the long-time exposure image and the short-time exposure image are transmitted to the synthesis section 144, the synthesis section 144 performs detection processing (S162) on the long-time exposure image and the short-time exposure image.

The synthesis section 144 detects through the detection processing (S162) of the long-time exposure image and the short-time exposure image, for example, signal amounts at the respective signal levels of the long-time exposure image, signal amounts at the respective signal levels of the short-time exposure image, a distribution (histogram) of the signal amounts at the respective signal levels of the long-time exposure image, or a distribution of the signal amounts at the respective signal levels of the short-time exposure image.

On the basis of the detection result in the detection processing (S162), the microcomputer 137 determines La (switch luminance signal level) indicative of the highest luminance signal level in the low-middle luminance region in the long-time exposure image, and Lb indicative of the highest luminance signal level in the high luminance region in the short-time exposure image. La and Lb will be described later in detail.

(3.3. Synthesis Processing (S164) of Image Pickup Apparatus 102)

After the detection processing (S162), the synthesis processing (S164) is performed on the long-time exposure image and the short-time exposure image in the synthesis section 144, whereby a composite image is generated. The synthesis section 144 performs the synthesis processing (S164) on the basis of information transmitted from the microcomputer 137, for example, La. The synthesis processing will be described below in detail.

The synthesis processing according to the present embodiment performs switching on the basis of the switch point (Switch point) so as to adopt pixels corresponding to the luminance signal levels of the long-time exposure image as to luminance signal levels lower than the switch point and, when the switch point is exceeded, adopt pixels corresponding to the luminance signal levels of the short-time exposure image.

Figure 7:
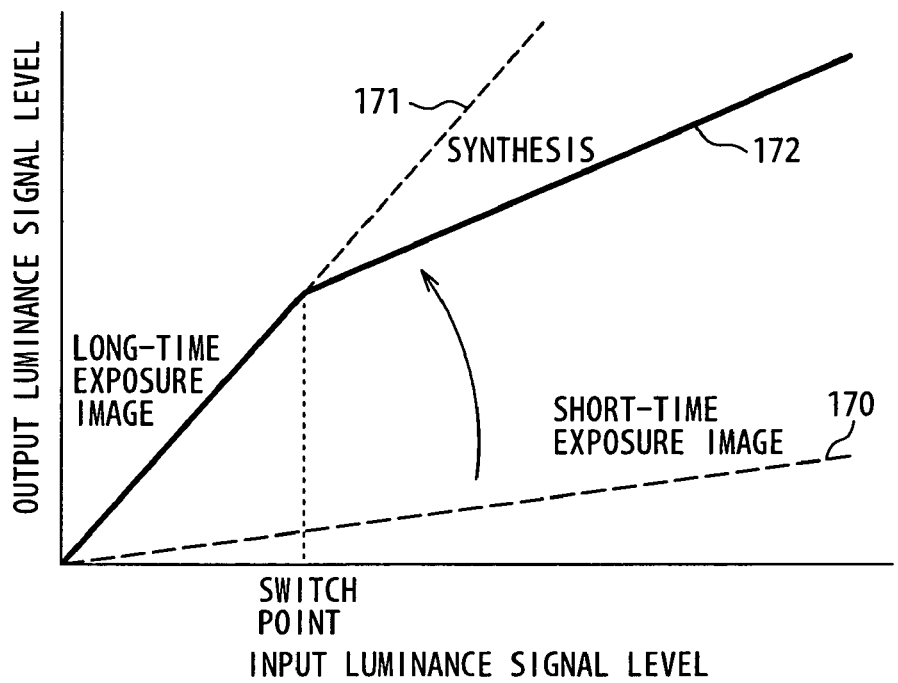
FIG. 7 is an explanatory view schematically showing the input/output characteristics of images during synthesis processing according to the present embodiment.

Accordingly, one composite image is synthesized by switching a target to be adopted, from the long-time exposure image to the short-time exposure image in units of pixels. The switch point according to the present embodiment will be described below with reference to FIG. 7. FIG. 7 is an explanatory view schematically showing the input/output characteristics of images during the synthesis processing according to the present embodiment.

As shown in FIG. 7, the input/output characteristic of the short-time exposure image (short) is a short-time input/output characteristic 170, the input/output characteristic of the long-time exposure image (long) is a long-time input/output characteristic 171, and the input/output characteristic of the output image outputted from the signal processing section 133 as the video signal is an output image input/output characteristic 172. The horizontal axis shown in FIG. 7 represents the luminance signal levels of image signals inputted to the synthesis section 144, while the vertical axis represents the luminance signal levels of image signals outputted from the synthesis section 144.

First, for synthesis, the exposure ratio of the long-time exposure image to the short-time exposure image is multiplied by the short-time exposure image, whereby the levels of both images are adjusted. For example, if the exposure ratio of the long-time exposure image to the short-time exposure image is 10:1, the exposure of the short-time exposure image is one-tenth of the long-time exposure image. However, the amount of existing light is ten times the luminance signal levels of the short-time exposure image. Accordingly, the levels are adjusted by multiplying the short-time exposure image by 10.

Accordingly, the inclination of the short-time input/output characteristic 170 moves in the direction of the arrow shown in FIG. 7, and the level of the short-time input/output characteristic 170 coincides with that of the long-time input/output characteristic 171. Furthermore, on the basis of an appropriate switch point (switch point), the short-time input/output characteristic 170 is inclined by the amount of predetermined inclination, whereby the output image input/output characteristic 172 is obtained.

The predetermined inclination is stored in, for example, the storage medium 139, and further, the microcomputer 137 performs the processing of inclining the short-time input/output characteristic 171 level-adjusted by the above-mentioned multiplication, by the amount of the predetermined inclination. The reason for the short-time input/output characteristic 171 is inclined by the above-mentioned amount of inclination is that the dynamic range is very wide and noise such as image distortion needs to be avoided.

When the level adjustment of the above-mentioned both images is completed, pixels to be adopted for a composite image are switched from the long-time exposure image to the short-time exposure image on the basis of the switch point (switch point) shown in FIG. 7, whereby one composite image is synthesized. Accordingly, a composite image is generated which has the characteristics of the long-time exposure image in which a dark section corresponding to the low-middle luminance signal levels is reproduced with good grayscale, and the characteristics of the short-time exposure image in which a bright section corresponding to the high luminance signal levels is reproduced with good grayscale, whereby the bright section and the dark section are reproduced with good grayscale.

(3.3.1 Exclusion Processing of Synthesis Section 144)

In the above-mentioned synthesis processing (S164), the pixels for the composite image are not equally adopted from the luminance signal levels of both the long-time exposure image and the short-time exposure image, and if there is not a signal amount corresponding to a luminance signal level, the exclusion processing of excluding the luminance signal level from the target to be synthesized is performed.

This means that the luminance signal level is not assigned to (is excluded from) the dynamic range of the composite image. Accordingly, it is possible to make effective use of the dynamic range to be assigned to the composite image.

Figure 8:
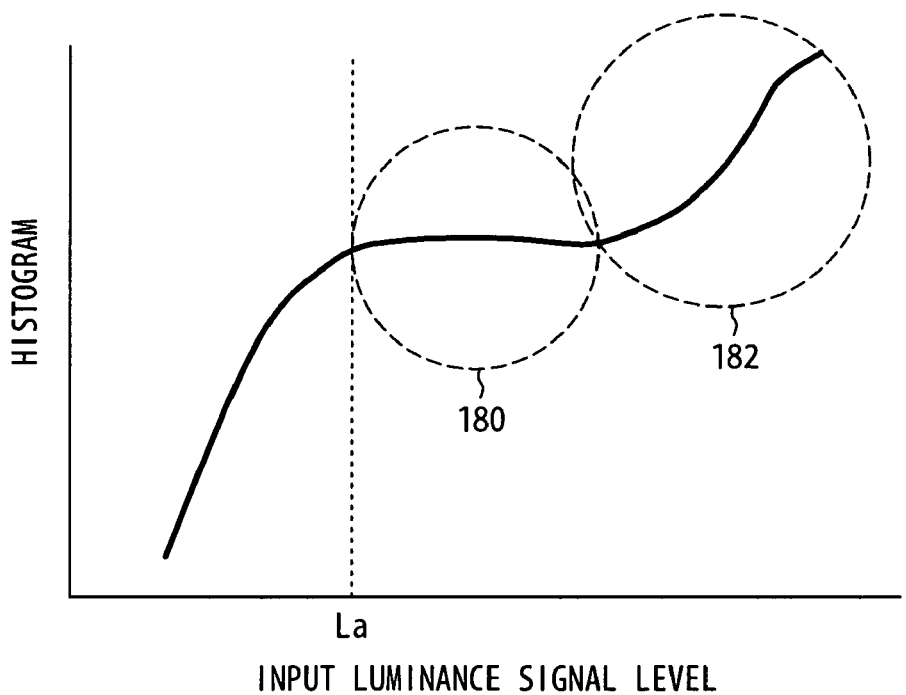
FIG. 8 is a cumulative histogram schematically showing a distribution of the luminance signal levels of a long-time exposure image according to the present embodiment.
Figure 9:
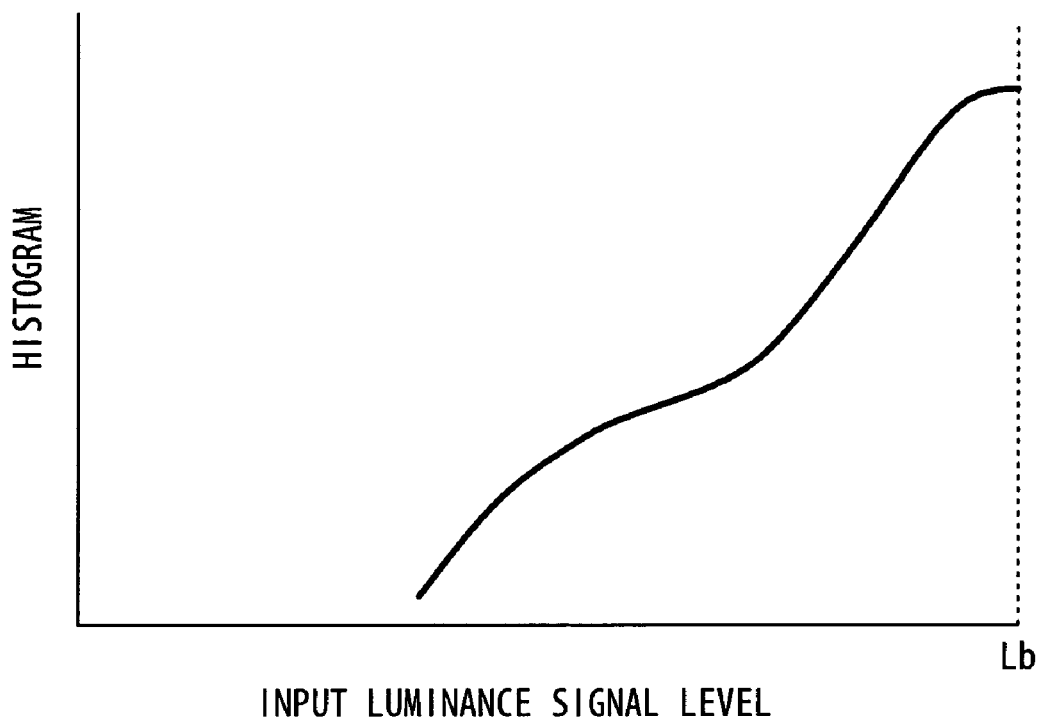
FIG. 9 is a cumulative histogram schematically showing a distribution of the luminance signal levels of a short-time exposure image according to the present embodiment.

The exclusion processing according to the present embodiment for making effective use of the dynamic range in the synthesis processing (S164) will be described below with reference to FIGS. 8 and 9. FIG. 8 is a cumulative histogram schematically showing a distribution of the luminance signal levels of the long-time exposure image according to the present embodiment, and FIG. 9 is a cumulative histogram schematically showing a distribution of the luminance signal levels of the short-time exposure image according to the present embodiment.

First, as shown in FIG. 8, as the luminance signal level becomes gradually higher toward the highest luminance signal level La (switch luminance signal level) in the low-middle luminance region, the signal amount is accumulated. When the luminance signal level exceeds La, the signal amount is not accumulated in the range of luminance signal levels shown as a range 180. Accordingly, in the range 180, a signal or a pixel is absent. In FIGS. 8 and 9, the horizontal axis represents the luminance signal levels of image signals inputted to the synthesis section 144, while the vertical axis represents a cumulative signal amount.

If a signal or a pixel corresponding to a luminance signal level is absent like in the range 180 shown in FIG. 8, the luminance signal level corresponding to the range 180 is excluded from the target for the synthesis processing (S164). Accordingly, the excluded luminance signal level is not assigned to the dynamic range of the composite image, whereby it is possible to make effective use of the dynamic range.

Furthermore, although signals or pixels corresponding to luminance signal levels in a range 182, shown in FIG. 8, which is a high luminance region, are present, the luminance signal levels overlap the luminance signal levels of the short-time exposure image shown in FIG. 9 which will be mentioned later. Since the luminance signal levels of the high luminance region in the long-time exposure image in particular overlap the luminance signal levels of the short-time exposure image, the luminance signal levels are excluded from the target for the synthesis processing (S164) Although the synthesis processing according to the present embodiment has been described with illustrative reference to the case where the overlapping luminance signal levels are excluded, the present invention is not limited to this example, and may also be carried out in the case where, for example, a luminance signal level is set in advance and excluded.

Namely, as shown in FIG. 8, the pixels corresponding to the luminance signal levels in the long-time exposure image for the synthesis processing (S164) from which the range 180 and the range 182 are excluded become a target to be adopted for the composite image. Accordingly, the range of luminance signal levels to be adopted for the synthesis processing (S164) is a range lower than La. Namely, by setting the above-mentioned La as the switch point (switch point) shown in FIG. 7, it is possible to efficiently use necessary pixels in the long-time exposure image, and it is possible to make effective use of the dynamic range of the composite image. Although La in the present embodiment is determined by the microcomputer 137, the present invention is not limited to this example, and may also be carried out in the case of, for example, the detection section 143.

The luminance regions according to the present embodiment are regions each having a predetermined luminance signal level range in an image, and the region in which luminances relatively correspond to low-middle luminances is made the low-middle luminance region, while the region in which luminances relatively correspond to high luminances is made the high luminance region. However, the present invention is not limited to this example, and may also be carried out in the case where, for example, the low-middle luminance region is further divided into a low luminance region and a middle luminance region.

Then, as shown in FIG. 9, the highest luminance signal level of the high luminance region in the short-time exposure image is set to Lb, and pixels corresponding to lower luminance signal levels than Lb are made a target to be applied to the composite image.

As described previously, in the short-time exposure image as well, if a signal or a pixel corresponding to a luminance signal level is absent, the luminance signal level is excluded from the target for the synthesis processing (S164). Accordingly, the excluded luminance signal level is not assigned to the dynamic range of the composite image, whereby it is possible to make effective use of the dynamic range with high use efficiency by assigning a section in which grayscales are absent to other luminance signal levels.

Furthermore, the present embodiment has been described with illustrative reference to the case where the switch point (switch point) is La (switch luminance signal level), but the present invention is not limited to this example and may also be carried out in the case where a luminance signal level which is set in advance is used as a switch point.

(3.4 Compression Processing (S168) in Image Pickup Apparatus 102)

In the image output operation of the image pickup apparatus 102 according to the present embodiment, the next processing following the synthesis processing (S164) is assignment processing (S166) as shown in FIG. 6, but compression processing (S168) will first be described below.

The dynamic range of the composite image synthesized in the synthesis processing (S164) is far wider than that of an image of, for example, a generally used type of video camera.

Accordingly, none of the processing sections (devices) provided in the image pickup apparatus 102 which is the wide dynamic range camera is able to process the composite image signal, so that the dynamic range of the composite image needs to be compressed to a processable dynamic range (the dynamic range of the output image).

Figure 10:
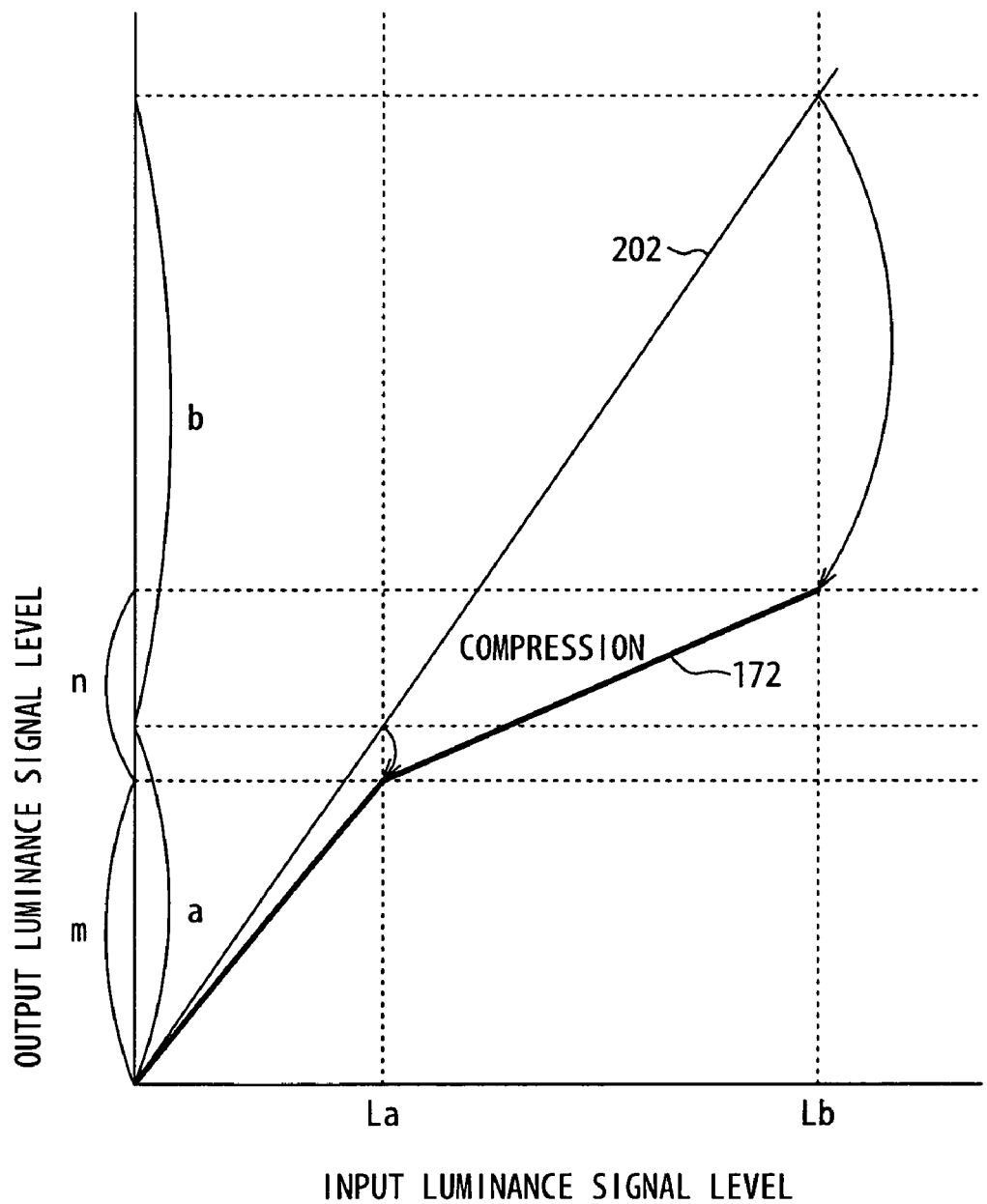
FIG. 10 is an explanatory view schematically showing the input/output characteristic of an output image according to the present embodiment.

First, the compression processing according to the present embodiment will be described below with reference to FIG. 10. FIG. 10 is an explanatory view schematically showing the input/output characteristic of the output image according to the present embodiment. In FIG. 10, the horizontal axis represents the luminance signal level of an image signal inputted to the compression section 146, while the vertical axis represents the luminance signal level of an image signal outputted from the compression section 146.

As shown in FIG. 10, the input/output characteristic of the composite image is a composite input/output characteristic 202, and the input/output characteristic of the output image in which the dynamic range of the composite image is compressed is the output image input/output characteristic 172. The output image is outputted from the signal preprocessing block 140 as a video signal, and is transmitted to the next signal postprocessing block (not shown).

The proportion of a low-middle luminance dynamic range to a high luminance dynamic range in the dynamic range of the composite image shown in FIG. 10 is a:b, where b=1−a. The proportion of a low-middle luminance dynamic range to a high luminance dynamic range in the dynamic range of the output image is m:n, where n=1−m.

The dynamic range (dynamic range) according to the present embodiment may include the high luminance dynamic range which is the dynamic range of the high luminance region and the low-middle luminance dynamic range which is the dynamic range of the low-middle luminance region.

The dynamic range is the range of brightness of a subject which may be handled by an image pickup device such as an image pickup device, i.e., the range of reproducible grayscales.

Accordingly, the brightness or grayscale of an image dramatically varies according to what proportion of the grayscale of a subject should be assigned to which of the high luminance dynamic range and the low-middle luminance dynamic range in the above-mentioned dynamic range. For example, if the grayscale of the high luminance region is to be weighted in the dynamic range of the output image, the proportion of n in the reproduction ratio of m:n is increased to increase the proportion of the high luminance dynamic range, whereby the detail of the grayscale of the high luminance region is reproduced.

Then, the compression gains for compressing the dynamic range of the composite image are found by the microcomputer 137. The compression gains found by the microcomputer 137 are the low-middle luminance compression gain (Gl) found on the basis of La in the low-middle luminance region and the high luminance compression gain (Gs) found on the basis of Lb in the high luminance region.

Since the low-middle luminance dynamic range of the composite image at La is compressed to the low-middle luminance dynamic range of the output image as shown in FIG. 10, the low-middle luminance compression gain (Gl) may be expressed by the following equation:

$$Gl=m/La \quad \text{(Eq. 1)}$$

La or Lb is found by the microcomputer 137 on the basis of the detection result by the detection section 143, such as the signal amounts or the histogram of the luminance signal levels.

Similarly, the high luminance compression gain is found by the microcomputer 137. Since the range of the high luminance region continues to Lb, the high luminance region between Lb and La needs to be accommodated into n. Therefore, the high luminance compression gain (Gs) at Lb may be expressed by the following equation:

$$Gs=n/(Lb-La) \quad \text{(Eq. 2)}$$

The high luminance dynamic range and the low-middle luminance dynamic range of the composite image which are found by the equations (1) and (2) are respectively compressed by the compression section 146 in the directions indicated by the arrows shown in FIG. 10, and the dynamic range of the composite image is assigned to the dynamic range of the output image.

Namely, it may be said that the assignment proportion of the high luminance dynamic range to the low-middle luminance dynamic range in the dynamic range of the composite image is assigned to the assignment proportion of the high luminance dynamic range to the low-middle luminance dynamic range in the dynamic range of the output image.

In addition, the low-middle luminance compression gain (Gl) and the high luminance compression gain (Gs) which are respectively found by the equations (1) and (2) are compression gains at the input luminance signal levels La and Lb, respectively. Accordingly, to be exact, the compression gains at the individual luminance signal levels between La and Lb differ from Gl or Gs.

The final compression gains are found by the compression gain calculation section 145. The compression gain calculation section 145 finds, on the basis of Gl and Gs transmitted from the microcomputer 137, a final low-middle luminance compression gain at each luminance signal level in the low-middle luminance region and a final high luminance compression gain at each luminance signal level in the high luminance region. Then, the compression gain calculation section 145 transmits the final high luminance compression gain and the final low-middle luminance compression gain to the compression section 146.

(3.5 Assignment Processing (S166) of Image Pickup Apparatus 102)

Figure 11:
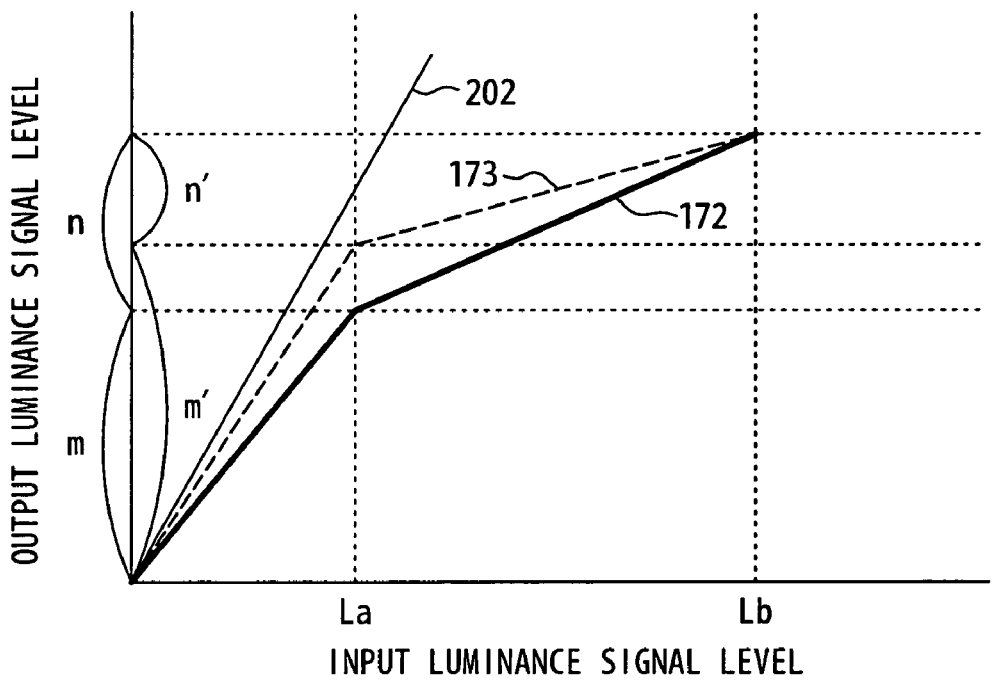
FIG. 11 is an explanatory view schematically showing the input/output characteristic of an output image according to the present embodiment.

The assignment processing (S166) according to the present embodiment will be described below with reference to FIG. 11. FIG. 11 is an explanatory view schematically showing the input/output characteristic of the output image according to the present embodiment.

Approximately like in FIG. 10, the input/output characteristic of the output image shown in FIG. 11 is the output image input/output characteristic 172, the input/output characteristic of a corrected output image is a corrected output image input/output characteristic 173, and the input/output characteristic of the composite image is the composite input/output characteristic 202. The proportion (reproduction ratio) of the low-middle luminance dynamic range to the high luminance dynamic range in the dynamic range of the output image is m:n, where n=1−m. In FIG. 11, the horizontal axis represents the luminance signal level of an image signal inputted to the compression section 146, while the vertical axis represents the luminance signal level of an image signal outputted from the compression section 146.

For example, when no signals at all exist in the high luminance region of a composite image, if an output image is reproduced by assigning the dynamic range of the composite image to only the range "m" which is the low-middle luminance dynamic range of the low-middle luminance region in the dynamic range of the output image, the output image exhibits a generally dark grayscale. The above-mentioned assignment of the dynamic range may be deemed inappropriate assignment and inefficient assignment.

Accordingly, the microcomputer 137 determines whether the proportion of a high luminance dynamic range to a low-middle luminance dynamic range in the dynamic range of an output image outputted previously is appropriate for a composite image to be newly inputted, and if the proportion is inappropriate, the microcomputer 137 performs correction by changing the proportion of the high luminance dynamic range to the low-middle luminance dynamic range to an appropriate proportion. Accordingly, it is possible to achieve efficient and appropriate assignment of the dynamic range.

To enable the above-mentioned assignment, the assignment proportion of the high luminance dynamic range to the low-middle luminance dynamic range in the dynamic range of the output image is dynamically varied for each input composite image. The dynamic change of the proportion according to the present embodiment is executed each time a composite image is inputted, but the present invention is not limited to this example and may also be carried out in the case where the assignment proportion of the dynamic ranges is changed each time, for example, five composite images are inputted.

In the dynamic change of the assignment proportion of the high luminance dynamic range to the low-middle luminance dynamic range, the proportion of the high luminance dynamic range to the low-middle luminance dynamic range, i.e., m:n, is corrected according to the signal amount of the high luminance region which occupies the composite image.

The correction of the proportion of the high luminance dynamic range to the low-middle luminance dynamic range according to the present embodiment is performed on the basis of the proportion of the high luminance region found from the signal amount of the high luminance region (the area of the high luminance region) or the average luminance signal level of the high luminance region. The case of the area of the high luminance region and the case of the average luminance signal level of the high luminance region will be separately described below.

The correction of the dynamic range according to the present embodiment will be described with illustrative reference to the case where the correction is performed according to the high luminance region occupying the composite image, but the present invention is not limited to this example and may also be carried out in the case where the dynamic range is corrected on the basis of an area or an average luminance signal level found from the signal amount of the low luminance region or low-middle luminance region.

(3.5.1 Assignment Processing (S166) Based on Area of High Luminance Region)

If m':n' is used to denote a corrected proportion obtained by correcting the proportion (m:n) of the low-middle luminance dynamic range to the high luminance dynamic range, m' and n' may be expressed by the following equations:

$$m' = f(x) \times n + m \quad \text{(Eq. 3)}$$

$$n' = 1 - m' \quad \text{(Eq. 4)}$$

Figure 12:
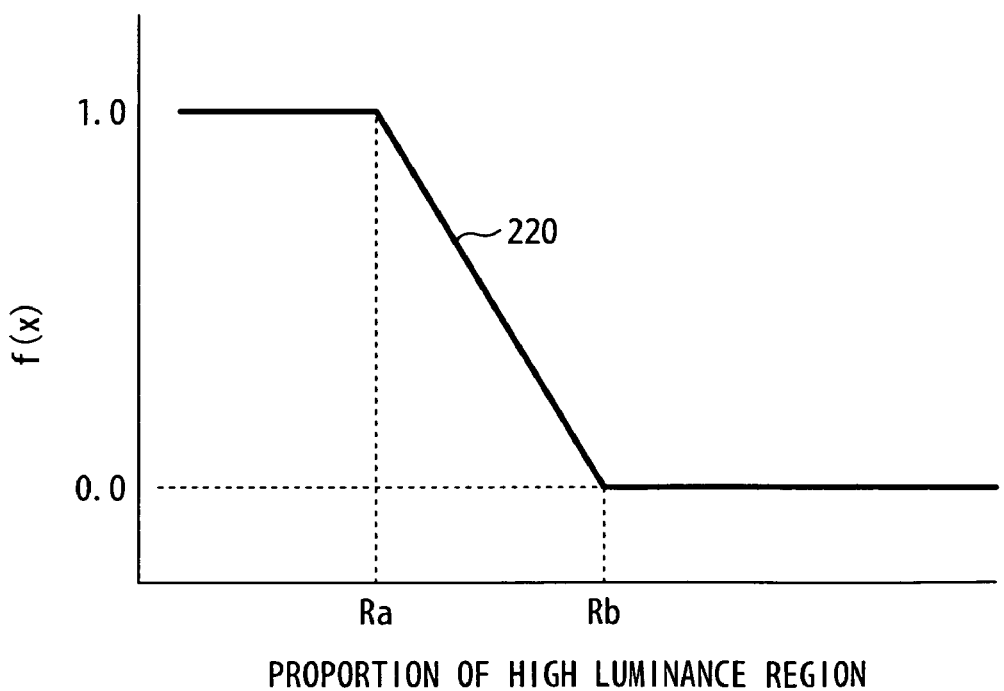
FIG. 12 is an explanatory view schematically showing a correction function based on the area of a high luminance region according to the present embodiment.

In the equation (3), f(x) is a correction function based on the area of the high luminance region. The input/output characteristic of the correction function f(x) will be described below with reference to FIG. 12. FIG. 12 is an explanatory view schematically showing the correction function based on the area of the high luminance region.

As shown in FIG. 12, the input/output characteristic of the correction function is an area input/output characteristic 220. The horizontal axis represents the proportion of the area of the high luminance region in the composite image, while the vertical axis represents correction values of the correction function f(x).

As shown in FIG. 12, when the proportion of the area of the high luminance region is less than Rb and not less than Ra, the correction value of the correction function f(x) takes any value from "1.0" to "0". Furthermore, m' and n' of the corrected proportion are found from the equations (3) and (4), whereby the assignment processing (S166) is performed. If the proportion of the area is not less than Ra, the entire high luminance dynamic range is assigned to the low-middle luminance dynamic range in the assignment processing (S166), while if the proportion of the area exceeds Rb, the assignment processing (S166) is not performed and the proportion of the high luminance dynamic range to the low-middle luminance dynamic range remains unchanged.

Accordingly, as shown in FIGS. 11 and 12, if the proportion of the area of the high luminance region is less than Rb and not less than Ra, as the proportion of the area of the high luminance region approaches Ra, m' of the corrected proportion increases. Namely, the corrected output image input/output characteristic 173 moves on the La axis in the vertically upward direction. This fact means that since the high luminance region decreases, the proportion in which the high luminance dynamic range is assigned to the low-middle luminance dynamic range increases. In contrast, as the proportion of the area of the high luminance region approaches Rb, m' of the corrected proportion decreases, and the corrected output image input/output characteristic shown in FIG. 11 moves on the La axis in the vertically downward direction, and approaches m.

In addition, as shown in FIG. 12, if the proportion of the area of the high luminance region is less than Ra, all the high luminance dynamic range of the output image assigned to the high luminance region is assigned to the low-middle luminance dynamic range.

Accordingly, as the high luminance region decreases, the proportion of the dynamic range to be assigned to the low-middle luminance dynamic range increases, whereby the grayscale reproducibility of the low-middle luminance region is improved. Namely, the proportion of the high luminance dynamic range to the low-middle luminance dynamic range is dynamically varied for each inputted output image according to the signal amount of the high luminance region thereof, whereby the dynamic range is corrected into a dynamic range appropriate for the output image.

Although the above description has referred to the example in which the correction function f(x) according to the present embodiment draws a monotonous variation, the present invention is not limited to this example and may also be carried out in the case where the correction function f(x) draws, for example, a quadratic curve.

Figure 13:
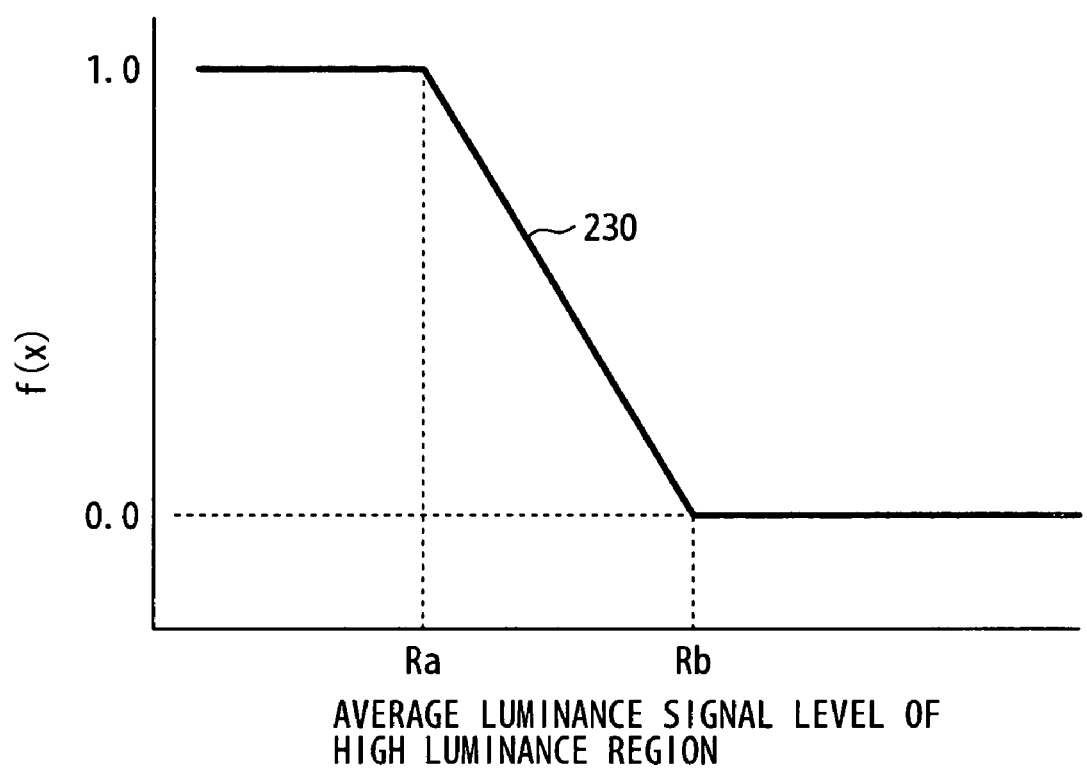
FIG. 13 is an explanatory view schematically showing a correction function based on an average luminance signal level of a high luminance region according to the present embodiment.

The assignment processing (S166) based on the average luminance signal level of the high luminance region has approximately the same configuration as the assignment processing (S166) based on the area of the high luminance region, and as shown in FIG. 13, the input/output characteristic based on the average luminance signal level of the high luminance region assumes an average luminance signal level 230, and the horizontal axis represents the average luminance signal level of the high luminance region.

Accordingly, as shown in FIGS. 11 and 13, if the average luminance signal level of the high luminance region is less than Rb and not less than Ra, as the proportion of the area of the high luminance region approaches Ra, m' of the corrected proportion increases. Namely, the corrected output image input/output characteristic 173 moves on the La axis in the vertically upward direction. This fact means that since the high luminance region decreases, the proportion in which the high luminance dynamic range is assigned to the low-middle luminance dynamic range increases.

In addition, as shown in FIG. 13, if the average luminance signal level of the high luminance region is less than Ra, all the high luminance dynamic range of the output image assigned to the high luminance region is assigned to the low-middle luminance dynamic range.

Accordingly, as the signal amount of the high luminance region decreases, the proportion of the dynamic range to be assigned to the low-middle luminance dynamic range increases, whereby the grayscale reproducibility of the low-middle luminance region is improved. Namely, the proportion of the high luminance dynamic range to the low-middle luminance dynamic range is dynamically varied for each inputted output image according to the signal amount of the high luminance region thereof, whereby the dynamic range is corrected into a dynamic range appropriate for the output image. Incidentally, m' and n' of the corrected proportion are found by the microcomputer 137.

In addition, Ra and Rb according to the present embodiment may be appropriately varied according to the characteristics of the image pickup apparatus 102, the kind of subject whose image is to be picked up, and the like.

Furthermore, the present invention may also be carried out in the case where both the area of the high luminance region and the average luminance signal level thereof are used in combination. In this case, if x and x' are respectively used to denote the proportion of the area of the high luminance region and the average luminance signal level of the high luminance section, the correction function is expressed as F(x, x'). In addition, if the corrected proportion is made m':n' like in the above description, m' and n' may be expressed by the following equations:

$$m'=F(x, x')\times n+m \quad \text{(Eq. 5)}$$

$$n'=1-m' \quad \text{(Eq. 6)}$$

Since the equations (5) and (6) have approximately the same configuration as the above-described ones, the detailed description of the equations (5) and (6) is omitted.

When the compression processing (S168) is completed, the compression section 146 transmits the output image to the signal postprocessing block as a video signal, and one sequence of image output operations is completed.

The dynamic range according to the present embodiment may include the low-middle luminance dynamic range which is the dynamic range of a region having luminances relatively corresponding to low-middle luminances, and the high luminance dynamic range which is the dynamic range of a region having luminances relatively corresponding to high luminances. However, the present invention is not limited to this example and may also be carried out in the case where, for example, the low-middle luminance dynamic range is further divided into a low luminance dynamic range and a middle luminance dynamic range.

Although the preferred embodiment of the present invention has been described above with reference to the accompanying drawings, the present invention is not limited to this example. It will be readily apparent to those skilled in the art that various changes or modifications may be made without departing from the technical idea set forth in the appended claims, and all such changes and modifications are, of course, considered to fall within the technical scope of the invention.

Although the above description of the embodiment has referred to the example in which the image pickup apparatus 102 picks up a black-and-white image, the present invention is not limited to this example, and may also be carried out in the case where the image pickup apparatus 102 picks up, for example, a color image or both a color image and a black-and-white image.

INDUSTRIAL APPLICABILITY

As described hereinabove, according to the present invention, dynamic ranges respectively assigned to a long-time exposure image and a short-time exposure image are dynamically varied according to the area of a high luminance region or the average luminance signal level of a high luminance section, whereby images may be reproduced with, for example, grayscale and exposure constantly maintained under optimum conditions. Furthermore, during synthesis, an unnecessary section such as the range of luminance signal levels in which signals are absent or the range of luminance signal levels overlapping the short-time exposure image is excluded from the long-time exposure image, whereby it is possible to make far more efficient use of the dynamic ranges.

The invention claimed is:

1. An image pickup apparatus comprising:
   an image pickup device for picking up an image of a subject;
   a signal processing section for generating a composite image, the composite image having a relatively wider dynamic range than at least either a dynamic range of a long-time exposure image picked up with a relatively long exposure time by said image pickup device or a dynamic range of a short-time exposure image picked up with a relatively short exposure time by said image pickup device, by synthesizing said long-time exposure image and said short-time exposure image; and
   a control section for compressing said composite image and dynamically varying an assignment proportion of a high luminance dynamic range to a low-middle luminance dynamic range in a dynamic range of an output image to be outputted as a video signal,
   wherein the signal processing section determines a black level based on a periodicity of image signals that include alternatively disposed long-time exposure image signal and short-time exposure image signal, and
   wherein an exposure ratio of the relatively long exposure time to the relatively short exposure time is multiplied by the short-time exposure image so that an amount of input light of the long-time exposure image and the short-time exposure image is substantially the same.

2. The image pickup apparatus according to claim 1,
   wherein said control section dynamically varies said assignment proportion of said high luminance dynamic range to said low-middle luminance dynamic range according to at least a luminance region which occupies said composite image.

3. The image pickup apparatus according to claim 1, wherein said control section corrects said assignment proportion of said high luminance dynamic range to said low-middle luminance dynamic range each time said composite image is generated.

4. The image pickup apparatus according to claim 2, wherein said luminance region is at least either a high luminance region or a low-middle luminance region.

5. The image pickup apparatus according to claim 1, wherein said control section dynamically varies said assignment proportion of said high luminance dynamic range to said low-middle luminance dynamic range according to at least an average luminance signal level of a high luminance region which occupies said composite image.

6. The image pickup apparatus according to claim 1, wherein said control section dynamically varies said assignment proportion of said high luminance dynamic range to said low-middle luminance dynamic range according to at least an average luminance signal level of a low-middle luminance region which occupies said composite image.

7. The image pickup apparatus according to claim 1, wherein said control section dynamically varies said assignment proportion of said high luminance dynamic range to said low-middle luminance dynamic range according to at least a high luminance region which occupies said composite image.

8. The image pickup apparatus according to claim 1, wherein said control section dynamically varies said assignment proportion of said high luminance dynamic range to said low-middle luminance dynamic range according to at least a low middle luminance region which occupies said composite image.

9. The image pickup apparatus according to claim 1, wherein said control section at least monotonically varies said assignment proportion of said high luminance dynamic range to said low-middle luminance dynamic range.

10. An image pickup apparatus comprising:
an image pickup device for picking up an image of a subject;
a signal processing section for generating a composite image, the composite image having a relatively wider dynamic range than at least either a dynamic range of a long-time exposure image picked up with a relatively long exposure time by said image pickup device or a dynamic range of a short-time exposure image picked up with a relatively short exposure time by said image pickup device, by synthesizing said long-time exposure image and said short-time exposure image; and
a control section for compressing said composite image and dynamically assigning the dynamic range of said composite image to the dynamic range of an output image to be outputted as a video signal,
wherein the signal processing section determines a black level based on a periodicity of image signals that include alternatively disposed long-time exposure image signal and short-time exposure image signal, and
wherein an exposure ratio of the relatively long exposure time to the relatively short exposure time is multiplied by the short-time exposure image so that an amount of input light of the long-time exposure image and the short-time exposure image is substantially the same.

11. The image pickup apparatus according to claim 10, wherein said control section dynamically assigns the dynamic range of said composite image to the dynamic range of said output image according to at least a luminance region which occupies said composite image.

12. The image pickup apparatus according to claim 10, wherein said control section dynamically assigns the dynamic range of said composite image to the dynamic range of said output image each time said composite image is generated.

13. The image pickup apparatus according to claim 10, wherein said control section dynamically assigns the dynamic range of said composite image to the dynamic range of said output image according to at least a high luminance region which occupies said composite image.

14. The image pickup apparatus according to claim 13, wherein said control section dynamically assigns the dynamic range of said composite image to the dynamic range of said output image according to at least an average luminance signal level of said high luminance region which occupies said composite image.

15. The image pickup apparatus according to claim 10, wherein said dynamic range is at least either a high luminance dynamic range or a low-middle luminance dynamic range.

16. The image pickup apparatus according to claim 15, wherein said control section dynamically assigns assignment of at least either said high luminance dynamic range or said low-middle luminance dynamic range of said output image according to a high luminance region which occupies said composite image.

17. The image pickup apparatus according to claim 15, wherein said control section dynamically assigns a section of said high luminance dynamic range of said output image to said low-middle luminance dynamic range according to at least a decrease of a high luminance region which occupies said composite image.

18. The image pickup apparatus according to claim 15, wherein said control section dynamically assigns a section of said high luminance dynamic range of said output image to said low-middle luminance dynamic range according to at least a decrease of an average luminance signal level of a high luminance region which occupies said composite image.

19. The image pickup apparatus according to claim 15, wherein said control section dynamically assigns a section of said low-middle luminance dynamic range of said output image to said high luminance dynamic range according to at least an increase of a high luminance region which occupies said composite image.

20. The image pickup apparatus according to claim 15, wherein said control section dynamically assigns a section of said low-middle luminance dynamic range of said output image to said high luminance dynamic range according to at least an increase of an average luminance signal level of a high luminance region which occupies said composite image.

21. The image pickup apparatus according to claim 15, wherein said control section at least monotonically varies an assignment proportion of said high luminance dynamic range to said low-middle luminance dynamic range of the said output image.

22. An image pickup apparatus comprising:
an image pickup device for picking up an image of a subject;
a detection section for detecting an image signal of a long-time exposure image picked up with a relatively long exposure time by said image pickup device, and an image signal of a short-time exposure image picked up with a relatively short exposure time by said image pickup device;
a synthesis section for generating a composite image from said long-time exposure image and said short-time exposure image on the basis of a switch luminance signal level determined from said image signals;

a control section for compressing said composite image according to a luminance region which occupies said composite image, and dynamically assigning a dynamic range of an output image to be outputted as a video signal; and a compression section for compressing the dynamic range of said composite image on the basis of dynamic assignment of said dynamic range of said output image, wherein the detection section determines a black level based on a periodicity of image signals that include alternatively disposed long-time exposure image signal and short-time exposure image signal, and wherein an exposure ratio of the relatively long exposure time to the relatively short exposure time is multiplied by the short-time exposure image so that an amount of input light of the long-time exposure image and the short-time exposure image is substantially the same.

23. The image pickup apparatus according to claim 22, wherein said luminance region is at either a high luminance region or a low-middle luminance region.

24. The image pickup apparatus according to claim 22, wherein said synthesis section acquires, from said short-time exposure image, pixels corresponding to at least a higher luminance signal level than said switch luminance signal level among pixels constructed in said composite image.

25. The image pickup apparatus according to claim 22 wherein said synthesis section acquires, from said long-time exposure image, pixels corresponding to at least a lower luminance signal level than said switch luminance signal level among pixels constructed in said composite image.

26. The image pickup apparatus according to claim 22, wherein said dynamic range is at least either a high luminance dynamic range or a low-middle luminance dynamic range.

27. The image pickup apparatus according to claim 22, wherein said control section determines a compression gain for compressing a luminance signal level of said composite image on the basis of at least an assignment proportion of a high luminance dynamic range of said output image to a low-middle luminance dynamic range thereof 28. The image pickup apparatus according to claim 22, wherein said control section determines at least a high luminance compression gain for compressing a luminance signal level of a high luminance region in said composite image and a low-middle luminance compression gain for compressing a luminance signal level of a low-middle luminance region.

29. The image pickup apparatus according to claim 28, wherein said control section further includes a compression gain calculation section for determining, for each luminance signal level of said composite image, at least either a final high luminance compression gain or a final low-middle luminance compression gain which are to be used by said compression section, on the basis of at least either said high luminance compression gain or said low-middle luminance compression gain.

30. The image pickup apparatus according to claim 22, wherein said control section dynamically varies an assignment proportion between a high luminance dynamic range and a low-middle luminance dynamic range of said output image according to at least a high luminance region which occupies said composite image.

31. The image pickup apparatus according to claim 30, wherein said control section at least monotonically varies the assignment proportion of said high luminance dynamic range to said low-middle luminance dynamic range of said output image.

32. An image pickup apparatus comprising:

an image pickup device for picking up an image of a subject;

a detection section for detecting an image signal of a long-time exposure image picked up with a relatively long exposure time by said image pickup device, and an image signal of a short-time exposure image picked up with a relatively short exposure time by said image pickup device;

a synthesis section for excluding said luminance signal level from a target to be synthesized, when at least said image signal corresponding to a luminance signal level of either said long-time exposure image or said short-time exposure image is absent, and synthesizing said long-time exposure image and said short-time exposure image on the basis of a switch luminance signal level;

a control section which dynamically assigns a dynamic range of an output image to be outputted as a video signal in which a composite image is compressed, according to a luminance region which occupies said composite image in which said long-time exposure image and said short-time exposure image are synthesized; and a compression section for compressing the dynamic range of said composite image on the basis of dynamic assignment of said dynamic range of said output image, wherein the detection section determines a black level based on a periodicity of image signals that include alternatively disposed long-time exposure image signal and short-time exposure image signal, and wherein an exposure ratio of the relatively long exposure time to the relatively short exposure time is multiplied by the short-time exposure image so that an amount of input light of the long-time exposure image and the short-time exposure image is substantially the same.

33. The image pickup apparatus according to claim 32, wherein said synthesis section selects said luminance signal level lower than said switch luminance signal level in said long-time exposure image, as a target for said composite image.

34. The image pickup apparatus according to claim 32, wherein said synthesis section selects said luminance signal level higher than said switch luminance signal level in said short-time exposure image, as a target for said composite image.

35. The image pickup apparatus according to claim 32, wherein said luminance region is at least either a high luminance region or a low-middle luminance region.

36. The image pickup apparatus according to claim 32, wherein said dynamic range is at least either a high luminance dynamic range or a low-middle luminance dynamic range.

37. The image pickup apparatus according to claim 32, wherein said control section dynamically varies an assignment proportion of a high luminance dynamic range to a low-middle luminance dynamic range of said output image according to at least a high luminance region which occupies said composite image.

* * * * *

UNITED STATES PATENT AND TRADEMARK OFFICE
CERTIFICATE OF CORRECTION

PATENT NO. : 7,609,320 B2  Page 1 of 1
APPLICATION NO. : 10/528968
DATED : October 27, 2009
INVENTOR(S) : Keisuke Okamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 971 days.

Signed and Sealed this

Twelfth Day of October, 2010

David J. Kappos
*Director of the United States Patent and Trademark Office*